(12) United States Patent
Scaffardi et al.

(10) Patent No.: US 8,369,711 B2
(45) Date of Patent: Feb. 5, 2013

(54) ETHERNET TRANSMITTER APPARATUS

(75) Inventors: Mirco Scaffardi, Parma (IT); Gianluca Berrettini, Gragnano (IT); Rodolfo Di Muro, Stockholm (SE); Bimal Nayar, Milton Keyne (GB); Antonella Bogoni, Mantova (IT); Luca Poti, Pisa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 308 days.

(21) Appl. No.: 12/677,165

(22) PCT Filed: Mar. 17, 2008

(86) PCT No.: PCT/EP2008/053149
§ 371 (c)(1),
(2), (4) Date: Aug. 27, 2010

(87) PCT Pub. No.: WO2009/040142
PCT Pub. Date: Apr. 2, 2009

(65) Prior Publication Data
US 2010/0316377 A1   Dec. 16, 2010

(30) Foreign Application Priority Data
Sep. 28, 2007  (EP) .................................... 07117484

(51) Int. Cl.
*H04B 10/12* (2006.01)
(52) U.S. Cl. .......................................... 398/183; 398/52
(58) Field of Classification Search .................... 398/52, 398/183
See application file for complete search history.

(56) References Cited

U.S. PATENT DOCUMENTS
2007/0009269 A1   1/2007   Zitelli

FOREIGN PATENT DOCUMENTS
WO   WO 01/86849   11/2001
WO   WO 03/052988   6/2003

OTHER PUBLICATIONS

International Search Report for PCT/EP2008/053149, mailed Jun. 25, 2008.
Tanaka et al., "50 GHz spaced 40 Gbit/s 25WDM transmission over 480 km using band limited RZ signals", *Electronics Letters*, vol. 37, No. 12, Jun. 7, 2001, pp. 775-777, XP006016753.
Yang et al., "All-optical 40 Gbit/s NRZ to RZ format conversion by nonlinear polarisation rotation in SOAs", *Electronic Letters*, vol. 43, No. 8, Apr. 12, 2007, pp. 469-471, XP006028491.
Kim et al., "Experimental Demonstration of 10-Gb/s Data Format Conversions Between NRZ and RZ Using SOA-Loop-Mirror", *Journal of Lightwave Technology*, vol. 23, No. 2, Feb. 1, 2005, pp. 834-841, XP011127634.
Jepsen et al, "All-optical network interface for bit synchronization and regeneration", *IOOC-ECOC '97*, vol. 5, Sep. 22, 1997, pp. 89-92, XP006508722.

*Primary Examiner* — Danny Leung
(74) *Attorney, Agent, or Firm* — Nixon & Vanderhye, P.C.

(57) ABSTRACT

An optical transmitter apparatus comprises at least three input transmitters that each provide at an output an NRZ optical signal, at least two of the NRZ optical signals having substantially the same bit rate, each of the signals having a bit rate which is less than 100 Gbit/s and the sum of the bit rates of all of the at least three transmitters being equal to or greater than 100 Gbit/s, an NRZ to RZ converter associated with each transmitter which converts each NRZ signal into an optical RZ signal, an optical time division multiplexer which converts the RZ signals into at least two further signals, and a polarization multiplexer which processes the two further signals to provide two output signals of differing polarization.

15 Claims, 5 Drawing Sheets

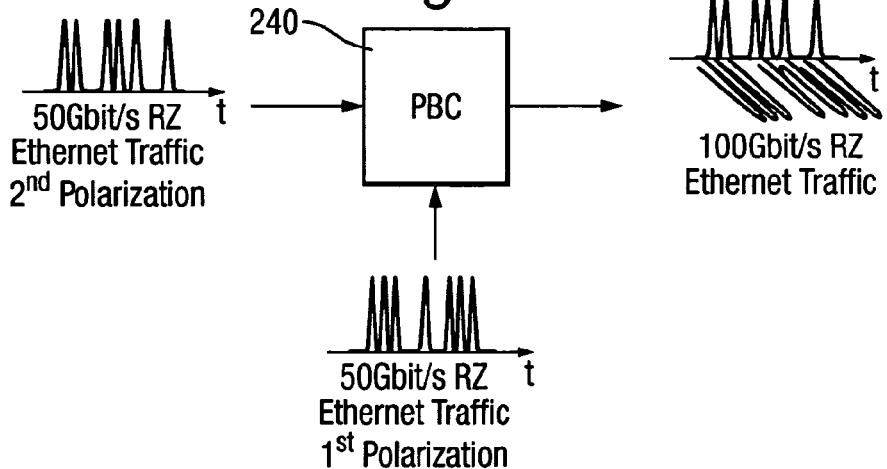
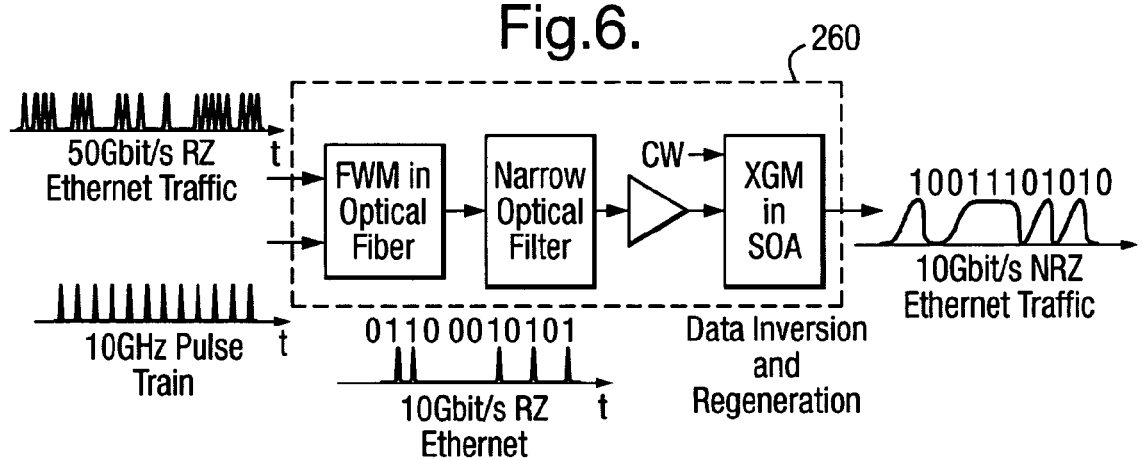
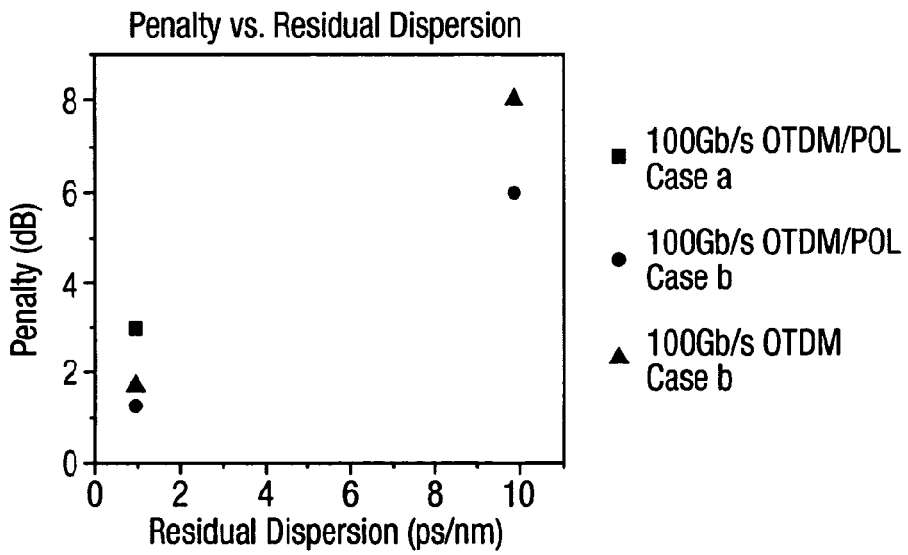

ETHERNET TRANSMITTER APPARATUS

This application is the U.S. national phase of International Application No. PCT/EP2008/053149 filed 17 Mar. 2008 which designated the U.S. and claims priority to EP Patent Application No. 07117484.1 filed 28 Sep. 2007, the entire contents of each of which are hereby incorporated by reference.

TECHNICAL FIELD

This invention relates to improvements apparatus for use in high speed optical Ethernet.

BACKGROUND

Ethernets are high speed networks, either electrical or optical, which are used widely to transmit high volumes of data between different nodes on a network. Such networks are getting faster all the time, as end users become more and more data hungry for streaming media content. At the time of filing this application 10 Gbit/s (gigabits per second or Gbps) Ethernet is the fastest of the Ethernet standards and is set out in standard IEEE 802.3-2005. The 10 Gbit/s Ethernet standard employs a system of duplex links connected by switches, each link comprising a transponder/transceiver which functions as a transmitter and a receiver of 10 Gbit/s optical signals.

There is now a proposal under open discussion to increase the speed, with speed of 100 Gbit/s of more. An Ethernet standard for 100 Gbit/s is presently under early development by the IEEE. The objective is to transmit data at the higher rate of 100 Gbit/s across a network with noise error levels below an acceptable level.

Currently there are no commercially available transceivers (by which we mean a combined transmitter and optionally a receiver) for 100 Gbit/s or higher. Laboratory experiments have centred on the use of Electrical and Optical time domain multiplexing (ETDM and OTDM) combined with wavelength division multiplexing to achieve the higher bit rate. These techniques use multiple wavelengths transmitted simultaneously. More wavelengths allow more signals or channels of data to be passed down a fibre at the same time. Unfortunately there are no currently available components for the optical modulator for such a scheme, in particular for the use with different wavelengths, meaning that the cost of implementing such a scheme will be very high as new devices need to be designed and placed into production.

SUMMARY

According to a first aspect the invention provides an optical transmitter apparatus for an optical Ethernet, the transmitter apparatus being capable of a transmission rate of at least 100 Gbit/s, the transmitter apparatus comprising:
at least three input transmitters that each provide at an output an NRZ optical signal, at least two of the NRZ optical signals having substantially the same bit rate, each of the signals having a bit rate which is less than 100 Gbit/s and the sum of the bit rates of all of the at least three transmitters being at least equal to 100 Gbit/s;
an NRZ to RZ converter associated with each transmitter which converts each NRZ signal into an optical RZ signal with the signal remaining in the optical domain during conversion, the optical RZ signal having the same bit rate as the corresponding NRZ signal;
an optical time division multiplexer which converts the RZ signals into at least two further signals, one of the further signals being formed by bitwise interleaving the bits of the at least two of the RZ signals which have the same bit rate,
and a polarisation multiplexer which processes the two further signals to provide two output signals of differing polarisation, each of the two output signals having the same bit rate as a respective one of the two further signals.

The bit rate of all of the NRZ signals may be the same.

Preferably the apparatus is capable of a bit rate of 100 Gbit/s, and the bit rate of each of the NRZ signals is less than or equal to 10 Gbit/second with at least ten input transmitters being provided. In a most preferred case ten 10 Gbit/s transmitters are provided.

By input transmitter we mean a device capable of either generating and supplying, or receiving and propagating, an NRZ signal to its output.

Both of the further signals may be formed by bitwise interleaving at least two of the NRZ signals. This means that at least four transmitters are needed to produce two pairs of at least two NRZ signals.

In the case of a 100 Gbit/s output obtained from ten 10 Gbit/second signals, each of the further signals may be composed of five interleaved RZ signals. The invention will therefore provide two simultaneously transmitted 50 Gbit/s signals from ten 10 Gbit/s signals. The values may, of course, be higher. For example, if ten 40 Gbit/s transmitters are used, a 400 Gbit/s output may be provided.

The invention therefore exploits existing lower speed (e.g. 10 Gbit/s) transmitters and using appropriate non-return to zero to return to zero conversion (NRZ-RZ converter), multiplexer and polarisation multiplexer generates a signal at higher (e.g. 100 Gbit/s) speed. This allows existing commercial 10 Gbit/s transmitters to be used which provides a cost effective solution. Additionally, by transmitting a signal with only a single wavelength a very low spectral occupancy is required. This could allow other signals to be sent across a network link at the same time. Furthermore, splitting the ten signals into two groups of five allows each bit of the signal to have a longer duration than a system in which they were not split. In fact, they can be up to twice as long in this arrangement.

Converting form NRZ to RZ enables the signals to be interleaved temporally with the data carrying bit of each signal fitting within the non-data carrying "zero" bit of the other signals.

The NRZ to RZ converters may be modulated with a respective clock signal matched to the bit rate of the NRZ signal. For example, a 10 GHz clock may be matched to a 10 Gbit/s NRZ signal. The signals output from the converter may then be time shifted using one or more optical delay lines to place the data carrying bits of the RZ signals in the correct temporal locations within a clock cycle for subsequent interleaving by the OTDM. The delay lines may comprise optical waveguides of predetermined length, the delay being a function of the time taken for the signals to propagate from one end of the waveguide to the other.

The clock duration (i.e. the length of the mark of the clock relative to the space in each clock cycle) may be less than one fifth of a clock cycle, so that the bits of the RZ signals are themselves less than one fifth of the period. The transceiver may include a delay line associated with each NRZ-RZ converter to time shift each signal into a respective time slot. This will allow five interleaved RZ signals to be used to make each of the two further signals.

The NRZ to RZ converter may comprise a semiconductor optical amplifier employing cross gain modulation. The amplifier may be driven with a continuous wave signal and the NRZ signal, and modulated with a pulse train having the same bit rate as the NRZ transmitters, for example 10 Gbit/s. The amplifier may have a first end and a second end, with a CW signal being applied to one end together with the NRZ signal, and the modulating pulse train being applied to the other. The output may be taken as the signal that comes out of the end to which the pulse train is applied.

Use of such an SOA based is preferred as it is a compact and efficient solution. The output of the SOA will be inverted, but this does not affect the data contained in the transmitted signal. The device is all optical, meaning the signal is processed entirely in the optical domain, which has potential for far higher speeds for electrical devices in which the signal is converted to the electrical domain.

The clock signal may be supplied from a suitable pulse source. This may comprise a pulse source which is synchronised with the incoming NRZ data signal from the input transmitter.

Alternatively, the clock signal may be derived directly using a sinusoidal clock to drive an electro absorption modulator that acts as a pulse generator modulating a continuous wave signal. The pulse signal obtained using this apparatus may then pass through an optical compression stage that reduces the pulse width to the desired value (i.e. less than one fifth of a clock cycle).

In each case, the clock should have the precise frequency of the incoming signal, and the start and end of each clock cycle should match the length of each bit of the incoming signal (although some lengthening or shortening or time shifting to allow for a guard region may be provided). The duration of each "bit" of the incoming RZ signal will equal the length of each clock cycle, and the duration of each pulse of the clock will be at most $\frac{1}{5}^{th}$ of the length of a clock cycle.

The optical compression stage may comprise a highly non linear fibre (HNLF) exploiting self-phase modulation. A length of 200 m or more, and preferably 250 m of such a fibre has been found to be suitable for such optical compression.

A polarisation converter may be provided which converts the polarisation of a subset of the RX signals to a different polarisation from the other RZ signals. As mentioned previously each subset is most preferably formed of five 10 Gbit/s signals. They may be shifted 90 degrees out of phase so they are orthogonally polarised. The polarisation shifting may be applied prior to conversion from NRZ to RZ or as part of the conversion. For instance the clock signal and a continuous wave signal used may be polarisation controlled. The polarisation converter may be an all optical device, meaning that the signal that is converter remains an optical signal at all times.

The optical time division multiplexer may comprise two optical time division multiplexer devices. For example, each one may process five of 10 Git/s RZ signals. Each device may comprise an optical time delay based multiplexer in the case that the RZ signals are all synchronised, i.e. they all occupy the same time slot within a clock cycle. Each signal may therefore pass through a different length time delay which may be a multiple of $\frac{1}{5}^{th}$ of the clock cycle. It is therefore clear to the skilled man that this part of the apparatus may therefore be implemented as an all optical device.

The polarisation beam combiner may comprise a multiplexer which has two inputs and one output. One of the received signals, such as a 50 Gbit/s signal, may be applied to each input and the combined, e.g. 100 Gbit/s, signal being passed to the output. It may be an all optical device.

The apparatus may also include a polarisation demultiplexer and an optical time domain demultiplexer for converting a received 100 Gbit/s signal comprising two 50 Gbit/s signals of different polarisation, each comprising five OTDM 10 Gbit/s signals, back into ten 10 Gbit/s signals. Each 10 Gbit/s signal may then be passed to a respective one of ten 10 Gbit/s receivers. Of course, the skilled person will understand that this is equally applicable to other bit rates such as 200 Gbit/s for the received signal.

This additional structure allows the transceiver to receive signals as well as send them. It can therefore be used to construct a full duplex Ethernet.

The polarisation demultiplexer may comprise a polarisation beam splitter that sends optical signals of one polarisation to a different path from optical signals of another polarisation.

Two optical time domain multiplexers may be provided, one for each path of polarisation. Each one must split out the five signals in that path.

The time domain demultiplexer may comprise a non-linear device which exploits a non-liner effect in a fibre or semiconductor device. For example it may comprise a SOA, or may comprise a HNLF exploiting four wave mixing between the signal and a 10 Ghz clock signal.

The clock signal for the demultiplexer may be recovered from the received signal.

The recovered 10 Gbit/s signal may be filtered using a narrow bandwidth filter which temporally stretches out the bits to return to a NRZ signal suitable for processing with a conventional 10 Gbit/s NRZ transceiver.

Finally, the transceiver may filter the signals output from the demultiplexer. Where the signals are sent as inverted signals, the recovered signals may be inverted to get the actual data values. The inversion may be performed by providing an SOA exploiting XGM and passing each recovered 10 Gbit/s signal through a respective SOA.

According to a second aspect the invention provides an Ethernet which comprises at least two transmitter apparatuses according to the first aspect of the invention connected by an optical link.

The optical link may comprise an optical fibre waveguide.

According to a third aspect the invention provides an optical transmitter apparatus for an optical Ethernet, the transmitter apparatus being capable of a transmission rate of at least 100 Gbit/s, the transmitter apparatus comprising:

at least three NRZ to RZ converters which each receive a respective NRZ signal and convert it into an optical RZ signal with the signal remaining in the optical domain during conversion, at least two of the NRZ signals having the same bit rate, each optical RZ signal having the same bit rate as the corresponding NRZ signal and each NRZ signal having a bit rate which is less than 100 Gbit/s and the sum of the bit rates from all of the at least three NRZ signals being at least equal to 100 Gbit/s;

an optical time division multiplexer which converts the RZ signals into at least two further signals, at least one of the further signals being formed by bitwise interleaving the bits of the at least two of the RZ signals which have the same bit rate, and a polarisation multiplexer which processes the two further signals to provide two output signals of differing polarisation, each of the two output signals having the same bit rate as a respective one of the two further signals.

Preferably both of the further signals are obtained by bitwise interleaving of at least two RZ signals which have the same bit rate.

All of the NRZ signals may have the same bit rate.

Most preferably only two further signals are provided.

Most preferably ten NRZ signals with a 10 Gbit/s bit rate are received and two 50 Gbit/s further signals are formed, each being formed from five of the ten signals which are different to five used for the other further signal. This will give a 100 Gbit/s output signal.

According to a fourth aspect the invention provides an optical signal having a bit rate of at least 100 Gbit/s suitable for transmission across an Ethernet, the signal comprising at least two sub-signals having different states of polarisation, at least one of the sub-signals comprising at least two sub-sub-signals which have the same bit rate and whose bits are temporally interleaved with the sub-signal.

The optical signal may comprise a 100 Gbit/s signal comprising two 50 Gbit/s sub signals, each comprising five interleaved 10 Gbit/s sub-sub signals.

Separate protection may be sought by way of this application for an optical receiver which is capable of receiving a signal of the fourth aspect of the invention and converting it back to separate sub-sub signals using optical processing apparatus. The apparatus may be as described in relation to optional features of the first aspect of the invention.

According to a fifth aspect the invention provides a method of generating an optical signal having a bit rate of at least 100 Gbit/s, the method comprising:
receiving at least three NRZ optical input signals, at least two of the NRZ optical signals having substantially the same bit rate, each of the signals having a bit rate which is less than the overall bit rate of the generated optical signal and the combined bit rates from all of the at least three input signals being at least equal to 100 Gbit/s;
converting each NRZ signal into an optical RZ signal with the signal remaining in the optical domain during conversion, the optical RZ signal having the same bit rate as the corresponding NRZ signal;
converting the RZ signals into at least two further signals, one of the further signals being formed by bitwise interleaving the bits of the at least two of the RZ signals which have the same bit rate,
and processing the two further signals to provide two output signals of differing polarisation, each of the two output signals having the same bit rate as a respective one of the two further signals.

The two output signals may be combined by simultaneously transmitting them across a suitable carrier to form the generated signal of at least 100 Gbit/s.

BRIEF DESCRIPTION OF THE DRAWINGS

There will now be described, by way of example only, one embodiment of the present invention with reference to the accompanying drawings of which:

FIG. 5 is a higher level block diagram of the function of the polarisation multiplexer of the transmitter of FIG. 1;

FIG. 6 is a higher level block diagram of the functional parts of the OTDM demultiplexer of the transmitter of FIG. 1;

FIG. 7 is a plot of penalty versus residual chromatic dispersion for a prototype transmitter constructed according to the illustration of FIG. 1;

DETAILED DESCRIPTION

Figure 1:
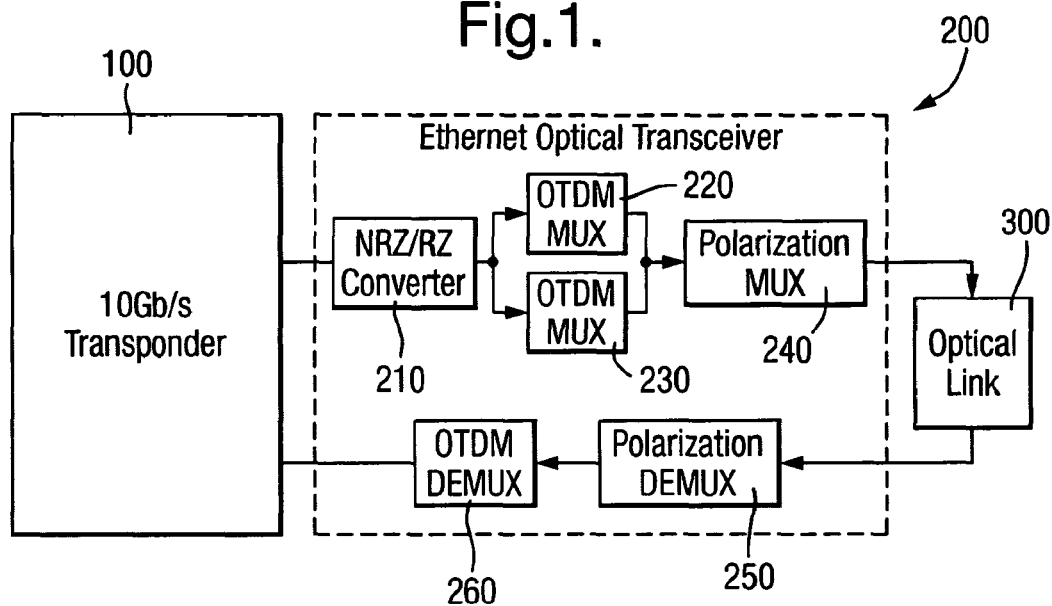
FIG. 1 is an overview of the key stages of an embodiment of a 100 Gbit/s transmitter apparatus in accordance with the first aspect of the invention.

The block diagram of an embodiment of a 100 Gbit/s optical transmitter apparatus for Ethernet in accordance with the first aspect of the invention is shown in FIG. 1 of the accompanying drawings. In fact, the apparatus is both a transmitter and a receiver of signals—a transceiver. Of course, it should be understood from the outset that although 100 Gbit/s has been chosen for this example higher speeds can be achieved through modification.

The transceiver can be supplied by up to ten 10 Gbit/s input transmitters or transponders. Each of the ten 10 Gbit/s commercial transponders supplies a NRZ (Non Return-to-Zero) 10 Gbit/s optical stream that is optically processed by the all-optical transceiver in order to obtain the 100 Gbit/s data flow.

The optical transceiver, that carries out the all-optical processing of 10 Gbit/s Ethernet signals, comprises an all-optical NRZ-to-RZ converter. The output of the converter is then fed to an OTDM multiplexer, which converts the 10 Gbit/s streams into two streams of 50 Gbit/s by temporally interleaving five 10 Gbit/s streams. The two streams are then given different polarisations before being combined into a single stream by a polarisation beam combiner. The 100 Gbit/s signal is then fed into an optical link for onward transmission across the Ethernet.

In addition, the transceiver includes structure that enables it to receive such a signal from an optical link and convert it back into ten 10 Gbit/s signals which can be processed by the ten transponders. This structure comprises a polarisation demultiplexer followed by an optical time domain demultiplexer.

This process allows the same ten 10 Gbit/s transponders used to supply the signals to process the extracted signals.

Figure 2:
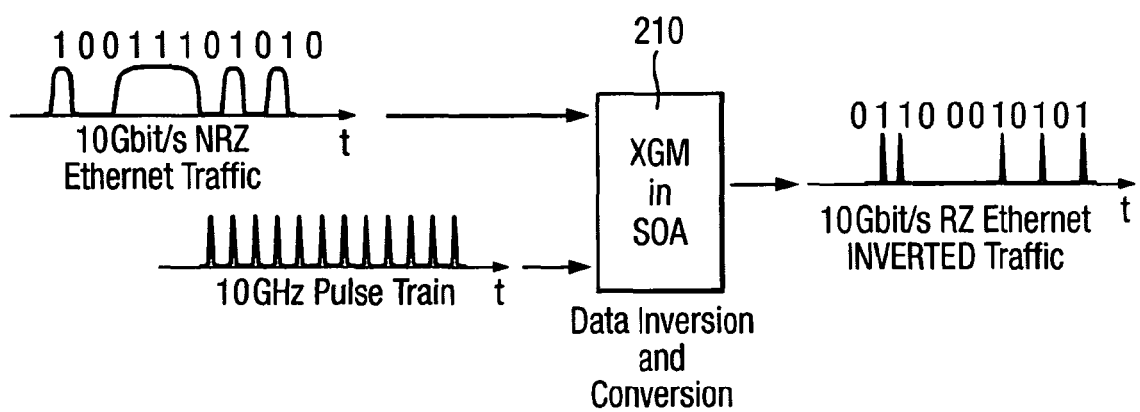
FIG. 2 is a higher level block diagram of the function of the NRZ/RZ block of the embodiment of FIG. 1.

The NRZ-RZ converter is shown in more detail in the block diagram of FIG. 2 of the accompanying drawings. Its function is to transform the 10 Gb/s Ethernet signals from the transponders into 10 Gbit/second RZ signals which can subsequently be interleaved using time division multiplexing.

The NRZ-RZ block in the illustrated embodiment is realized by exploiting Cross Gain Modulation (XGM) nonlinear effect in a Semiconductor Optical Amplifier (SOA) between 10 Gbit/s NRZ Ethernet signal and a 10 GHz RZ periodic clock with a pulse width shorter of the OTDM aggregated frame bit time.

Figure 10:
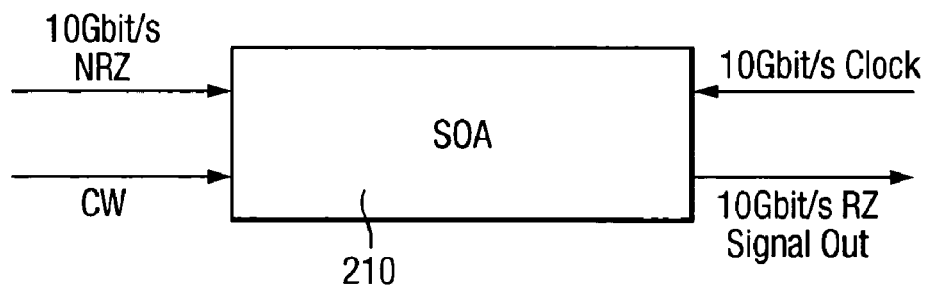
FIG. 10 illustrates the arrangement of an SOA in an NRZ/RZ converter of the kind shown in FIG. 2.

A suitable arrangement of such an SOA is shown in FIG. 10 of the accompanying drawings. At one end of the SOA are two input signals—the NRZ signal and a continuous wave CW signal. At the other is applied the clock signal. When the clock signal is low, the SOA is in an unsaturated state and the CW signal is modulated by the data carrying signal. This modulated signal passes through the amplifier and passes out to the output. When the clock signal is high, the SOA is saturated and no amplification occurs, meaning that no signal is present at the output. In this way the converted signal is also logically inverted as well as being converted from an NRZ to RZ signal type.

Other techniques exploiting different kinds of nonlinear effects in different material can be used to carry out the NRZ-to-RZ conversion operation both with and without logical data inversion. Our choice is due to the compactness and the polarization insensitivity of the proposed scheme.

The mark-space ratio of the RZ clock applied to the NRZ-RZ converter should be less than 1:4, meaning that the clock is high for less than $1/5^{th}$ of the duration of each clock beat or cycle. In this way, the RZ signal output from the converter will also be high for $1/5^{th}$ or less of the time, coinciding with the high state of the clock beat. This can be seen in FIG. 1.

Figure 3:
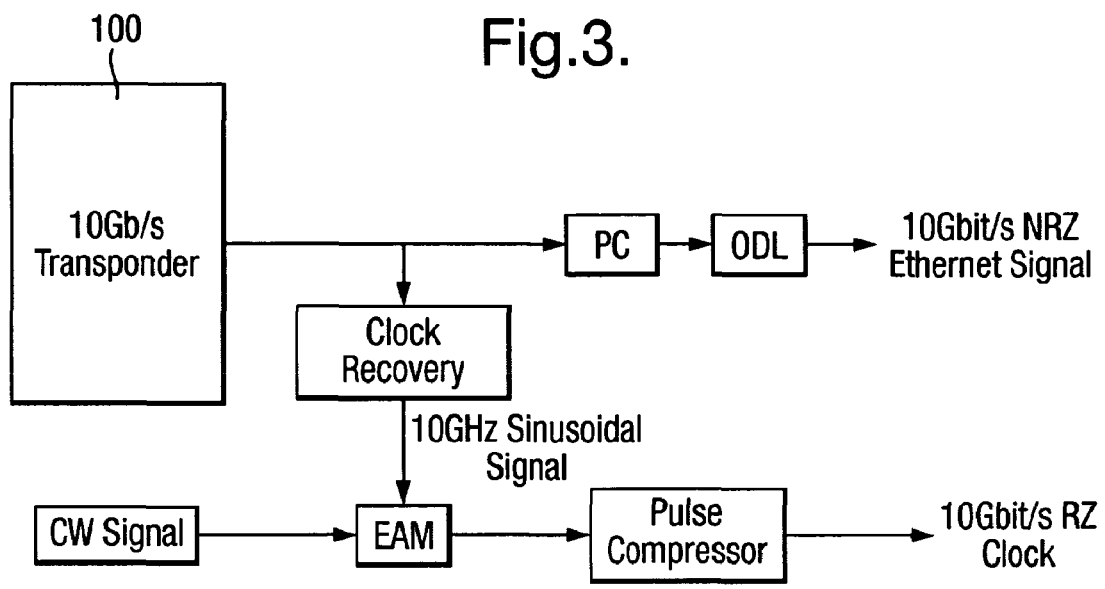
FIG. 3 is a higher level block diagram of the function of the RZ clock generator for the NRZ/RZ converter of FIG. 2.

The RZ clock can be generated using a pulse source synchronized with the 10 Gb/s NRZ data flow. Alternatively it can be generated directly to using a sinusoidal clock signal to drive an Electro Absorption Modulator (EAM), that acts as pulse generator modulating a Continuous Wave (CW). This arrangement has been used in the described embodiment and is illustrated in FIG. 3 of the accompanying drawings. In this case a following optical compression stage can be applied in order to reduce the pulse width to the required $1/5^{th}$ or less of the clock beat. The optical compression can be obtained by means of a 250 m-long High Non Linear Fibre (HNLF) span where Self-Phase Modulation (SPM) can be exploited.

The 10 GHz RZ clock that is generated, and the 10 Gb/s NRZ signals from the transponders are polarization controlled and time synchronized by means of a polarization controller and an optical delay line in order to maximize the nonlinear effect exploited for the NRZ-to-RZ conversion.

Figure 4:
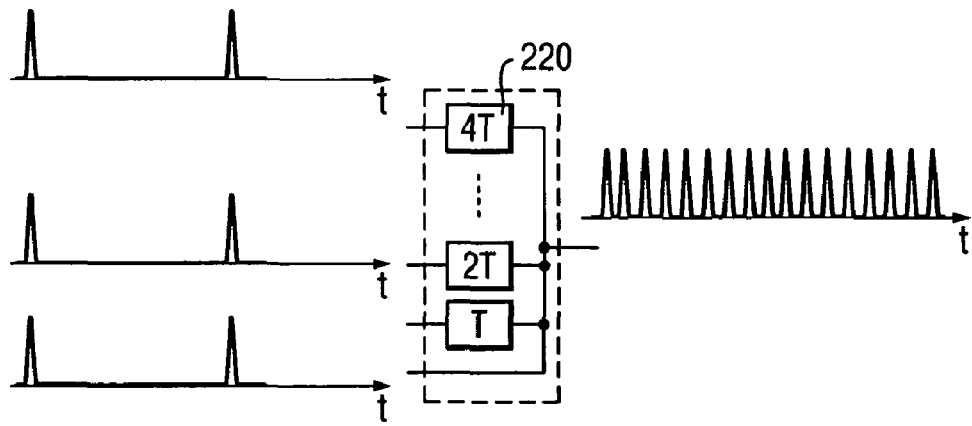
FIG. 4 is diagram illustrating the function of one of the OTDM multiplexers of the transmitter of FIG. 1.

Five RZ channels obtained in such a way are aggregated by means of the OTDM optical delay-based multiplexer in order to obtain a 50 Gbit/s Ethernet signal as shown in FIG. 4. This is repeated for the remaining five channels to provide a second 50 Gbit/s Ethernet signal.

The Polarization Beam Combiner (PBC) used as a Polarization Multiplexer is shown more clearly in FIG. 5 of the accompanying drawings. This enables the coupling of the two 50 Gbit/s Ethernet signals with orthogonal polarizations onto a single optical link to achieve a true 100 Gbit/s Ethernet frame.

When the transceiver functions as a receiver for such a signal, both the 50 Gbit/s frames are separated by the Polarization Beam Splitter (PBS) acting as a Polarization Demultiplexer. After that the 10 Gbit/s Ethernet frame is extracted by an Optical Demultiplexer that can realized in different ways exploiting nonlinearities in fibre or semiconductor devices. The second solution presents some advantages in terms of cost, compactness, and stability.

In the presented implementation Four Wave mixing (FWM) nonlinear effect was exploited using a 250 meter-long HNLF between the 50 Gbit/s signal and a 10 GHz periodic clock. This is shown in FIG. 6 of the accompanying drawings. A narrow bandwidth filter then broadens the time pulse width of the extracted channel to a width equal to or approximating the clock beat, mimicking a true NRZ signal. This allows the use of the conventional NRZ 10 Gbit/s transponders to handle the signals. Subsequently, in order to recover the original data sequence the signal is logically inverted, (since it was inverted during its creation). This is achieved by exploiting a regenerative block based on XGM in a SOA between itself and a CW light. Finally, the 10 Gbit/s Ethernet frame is electrically received by the transponder.

One advantage of this proposed embodiment is that electrical devices, meaning devices which process signals electrically, with bandwidth higher than 10 GHz, are not needed. All processing above this rate is performed entirely in the optical domain with optical devices. Moreover the OTDM approach with double polarization maintains the compatibility with commercial 10 GHz apparatuses.

With respect to a WDM technique, clearly the proposed implementation requires a very lower spectral occupancy.

Finally, with respect to a standard OTDM approach, the proposed embodiment permits larger pulse width and consequently it can mostly tolerate the linear transmission effects reducing the transmission impairments, as demonstrated in FIG. 7, where the penalty (evaluated at BER=$10^{-9}$) versus the link residual chromatic dispersion is reported. Moreover, through testing of a prototype constructed in accordance with the described embodiment, the applicant has verified that the invention can reduce the impact of the transmitter jitter on its performances with respect to a standard OTDM technique. This is illustrated in FIG. 8 of the accompanying drawings.

Figure 8:
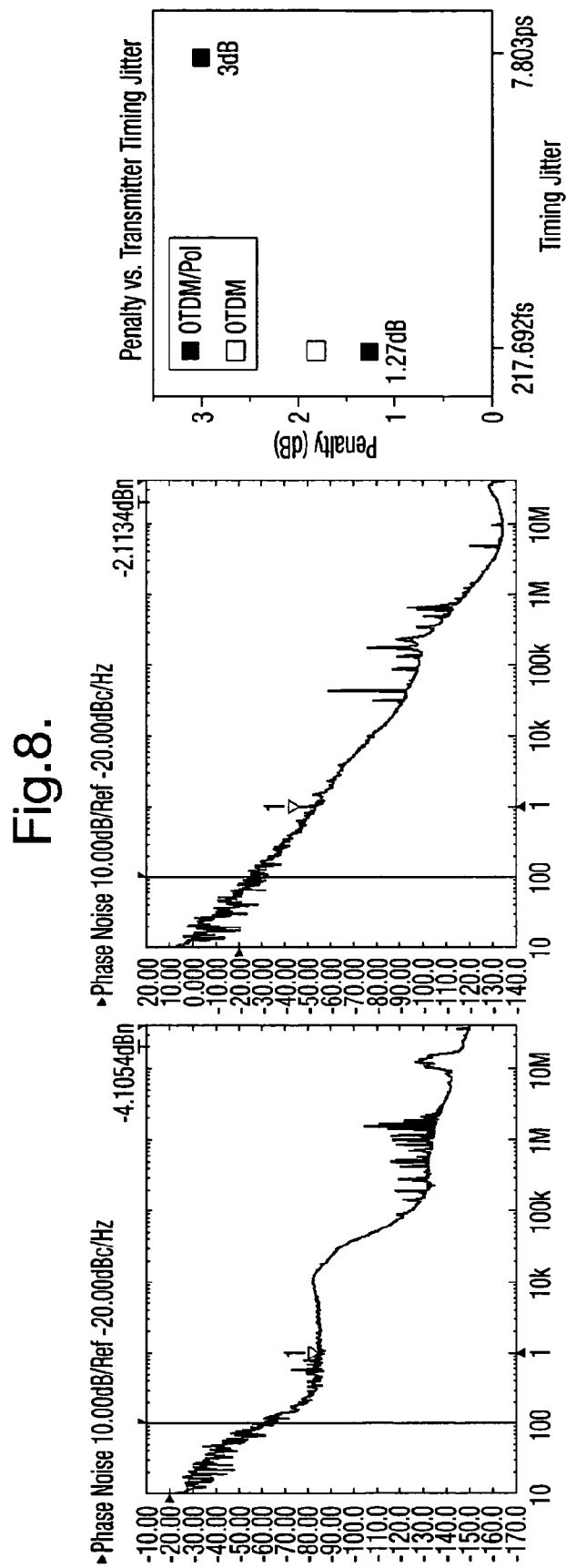
FIG. 8 is a plot showing transmitter jitter and penalty as a function of transmitter jitter.

In fact, in FIG. 7 and FIG. 8, we can compare the impact of different transmitter jitter values and different link residual chromatic dispersion values respectively, in the case of OTDM with a single polarization and in the proposed case. FIG. 8 (left and centre) reports the Root Mean Square timing jitter values of 217.692 fz and 7.803 ps for two different transmitters used in this experiments (case a and b respectively). The jitter values have been measured in the range 100 HZ and 40 MHz, using an Agilent E5052 Signal Source Analyzer. In FIG. 7 (right) the power penalty (BER=$10^{-9}$) as a function of transmitters jitter is reported, in case of residual dispersion of 0.94 ps/nm. A strong degradation of the system performance is observed as a function of the phase noise introduced by the transmitter. Nevertheless for the lower jitter value the proposed solution introduces a 0.5 dB penalty improvement and for the higher jitter value the proposed solution is the only one able to guarantee acceptable penalty.

Concerning the sensitivity to the link residual chromatic dispersion, as reported in FIG. 7 a single polarization OTDM 100 Gbit/s signal is more sensitive than a 100 Gbit/s frame obtained orthogonally polarizing two OTDM 50 Gbit/s channels, due to its shorter bit time and larger spectral occupancy. Using the low-jitter transmitter we obtain an increasing difference between the penalties of the two different solutions. Moreover, as previously mentioned, an increase of the transmitter jitter value, makes the transmission of a single polarization OTDM 100 Gbit/s channel impossible.

Figure 9:
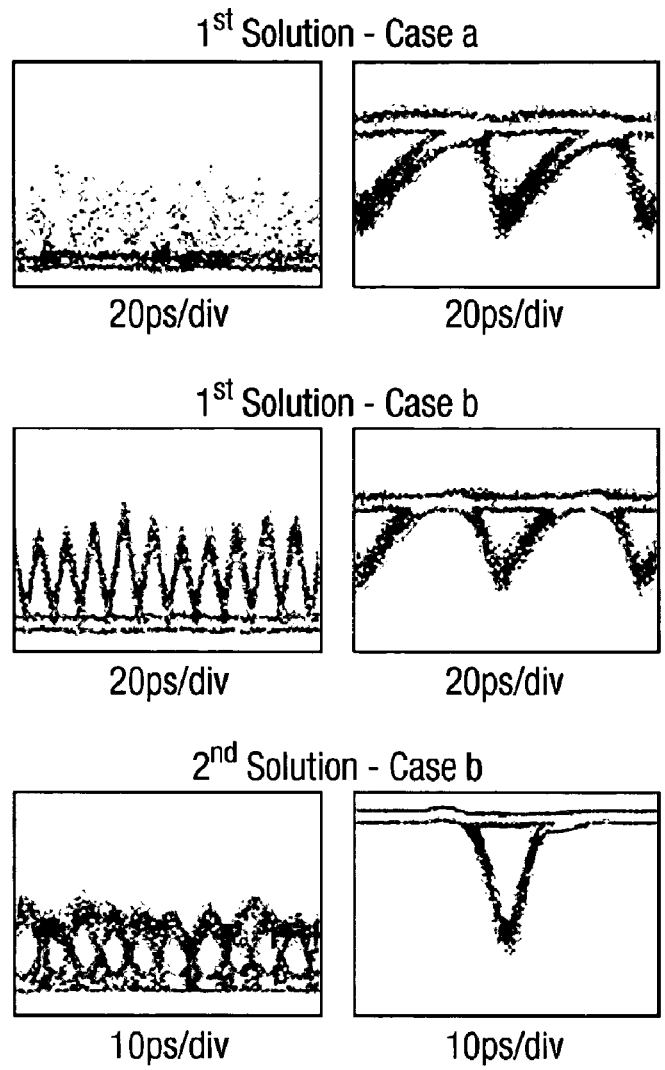
FIG. 9 are eye diagrams for typical received 100 Gbit/s received frames.

In FIG. 9 the eye diagrams of the 50 Gbit/s and 100 Gbit/s aggregated received Ethernet signals and the 10 Gbit/s demultiplexed signals for both implemented solutions are reported. Note that all traces are acquired exploiting a 50 Ghz-limited bandwidth oscilloscope and, in the case of the demultiplexed signal, an inverting photodiode.

The invention claimed is:

1. An optical transmitter apparatus for an optical Ethernet, the transmitter apparatus being capable of a transmission rate of at least 100 Gbit/s, the transmitter apparatus comprising: at least three input transmitters that each provide at an output an NRZ optical signal, at least two of the NRZ optical signals having substantially the same bit rate, each of the signals having a bit rate which is less than 100 Gbit/s and the sum of the bit rates of all of the at least three transmitters being equal to or greater than 100 Gbit/s; an NRZ to RZ converter associated with each transmitter which converts each NRZ signal into an optical RZ signal with the signal remaining in the optical domain during conversion, the optical RZ signal having the same bit rate as the corresponding NRZ signal; an optical time division multiplexer which converts the RZ signals into at least two further signals, one of the further signals being formed by bitwise interleaving the bits of the at least two of the RZ signals which have the same bit rate, and a polarisation multiplexer which processes the two further signals to provide two output signals of differing polarisation, each of the two output signals having the same bit rate as a respective one of the two further signals.

2. The transmitter apparatus of claim 1 in which the overall transmission rate is equal to 100 Gbit/s and in which ten 10

Gbit/s transmitters are provided, the apparatus forming two 50 Gbit/s further signals each formed from five RZ signals.

3. The transmitter apparatus of claim 1 in which the RZ signals output from the NRZ to RZ converters are time shifted using one or more optical delay lines to place the data carrying bits of the RZ signals in the correct temporal locations within a clock cycle for subsequent interleaving by the OTDM.

4. The transmitter apparatus of claim 1 in which the NRZ to RZ converters each comprise a semiconductor optical amplifier employing cross gain modulation and driven at a first end with a continuous wave signal and the NRZ signal, and at its other, second, end by a clock signal which is matched to the bit rate of the NRZ signal and which is sufficiently strong to saturate the amplifier, the RZ signal being taken as the output from the second end of the amplifier.

5. The transmitter apparatus of claim 4 which includes a source for a sinusoidal clock signal which is used to drive an electro-absorption modulator that acts as a pulse generator modulating a continuous wave signal.

6. The transmitter apparatus of claim 5 which includes an optical compression stage and in which the pulse signal obtained from the electro absorption modulator is passed through the compression stage to compress the pulse width.

7. The transmitter apparatus of claim 2 which includes a polarisation converter which converts the polarisation of five of the 10 Gbit RX signals to a different polarisation from the other five.

8. The transmitter apparatus of claim 1 which also includes a polarisation demultiplexer and an optical time domain demultiplexer for converting a received 100 Gbit/second signal comprising two signals of different polarisation, each comprising five OTDM 10 Gbit/second signals, back into ten 10 Gbit NRZ signals.

9. The transmitter apparatus of claim 8 in which the polarisation demultiplexer comprises a polarisation beam splitter that sends optical signals of one polarisation to a different path from optical signals of another polarisation.

10. The transmitter apparatus of claim 8 in which the or each time domain demultiplexer comprises a non-linear device which exploits a non-liner effect in a fibre or semiconductor device.

11. The transmitter apparatus of claim 10 in which the non-linear device comprises an SOA or a HNLF exploiting four wave mixing between the signal and a 10 GHz clock signal.

12. The transmitter apparatus of claim 10 in which a narrow bandwidth filter is provided and the recovered 10 Gbit/s signal is filtered using the narrow bandwidth filter which temporally stretches out the bits to return to a NRZ signal suitable for processing with a conventional 10 Gbit/s NRZ transceiver.

13. An optical transmitter apparatus for an optical Ethernet, the transmitter apparatus being capable of a transmission rate of at least 100 Gbit/s, the transmitter apparatus comprising: at least three NRZ to RZ converters which each receive a respective NRZ signal and convert it into an optical RZ signal with the signal remaining in the optical domain during conversion, at least two of the NRZ signals having the same bit rate, each optical RZ signal having the same bit rate as the corresponding NRZ signal and each NRZ signal having a bit rate which is less than 100 Gbit/s and the sum of the bit rates from all of the at least three NRZ signals being equal to or greater than 100 Gbit/s; an optical time division multiplexer which converts the RZ signals into at least two further signals, at least one of the further signals being formed by bitwise interleaving the bits of the at least two of the RZ signals which have the same bit rate, and a polarisation multiplexer which processes the two further signals to provide two output signals of differing polarisation, each of the two output signals having the same bit rate as a respective one of the two further signals.

14. The transmitter apparatus of claim 13 in which the transmission rate is equal to 100 Gbit/s and in which ten 10 Gbit/s transmitters are provided, the transceiver forming two 50 Gbit/s further signals each formed from five RZ signals.

15. A method of generating an optical signal having a bit rate of at least 100 Gbit/s, the method comprising: receiving at least three NRZ optical input signals, at least two of the NRZ optical signals having substantially the same bit rate, each of the signals having a bit rate which is less than the overall bit rate of the generated optical signal and the combined bit rates from all of the at least three input signals being equal to or greater than 100 Gbit/s; converting each NRZ signal into an optical RZ signal with the signal remaining in the optical domain during conversion, the optical RZ signal having the same bit rate as the corresponding NRZ signal; converting the RZ signals into at least two further signals, one of the further signals being formed by bitwise interleaving the bits of the at least two of the RZ signals which have the same bit rate, and processing the two further signals to provide two output signals of differing polarisation, each of the two output signals having the same bit rate as a respective one of the two further signals.

* * * * *

UNITED STATES PATENT AND TRADEMARK OFFICE
CERTIFICATE OF CORRECTION

| | | |
|---|---|---|
| PATENT NO. | : 8,369,711 B2 | Page 1 of 1 |
| APPLICATION NO. | : 12/677165 | |
| DATED | : February 5, 2013 | |
| INVENTOR(S) | : Scaffardi et al. | |

It is certified that error appears in the above-identified patent and that said Letters Patent is hereby corrected as shown below:

In the Specification

In Column 2, Line 43, delete "form" and insert -- from --, therefor.

In Column 4, Line 18, delete "non-liner" and insert -- non-linear --, therefor.

In Column 5, Line 57, delete "is diagram" and insert -- is a diagram --, therefor.

In the Claims

In Column 9, Line 42, in Claim 10, delete "non-liner" and insert -- non-linear --, therefor.

Signed and Sealed this
Third Day of September, 2013

Teresa Stanek Rea
*Acting Director of the United States Patent and Trademark Office*